(12) United States Patent
Seki

(10) Patent No.: US 7,063,342 B2
(45) Date of Patent: Jun. 20, 2006

(54) SUSPENSION ARM KIT, VEHICLE WITH PROTECTIVE SPACER ON SUSPENSION ARM, AND METHOD OF INSTALLING SUSPENSION ARM

(75) Inventor: Bunzo Seki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 261 days.

(21) Appl. No.: 10/696,732

(22) Filed: Oct. 29, 2003

(65) Prior Publication Data

US 2004/0169347 A1    Sep. 2, 2004

(30) Foreign Application Priority Data

Nov. 6, 2002 (JP) ............................. 2002-322600

(51) Int. Cl.
*B60G 3/04* (2006.01)
(52) U.S. Cl. ............................. 280/124.134; 384/488; 384/147
(58) Field of Classification Search ............... 384/488, 384/206, 208, 147; 280/124.144, 124.134, 280/124.135, 93.511, 124.13
See application file for complete search history.

(56) References Cited

U.S. PATENT DOCUMENTS

| 2,703,709 A | * | 3/1955 | Wagner ..................... 267/254 |
| 3,320,007 A | * | 5/1967 | Tennies et al. ............. 384/132 |
| 3,431,035 A | * | 3/1969 | Dangauthier ................. 384/582 |
| 4,615,538 A | * | 10/1986 | Solleder .............. 280/124.125 |
| 4,898,480 A | * | 2/1990 | Raj et al. ..................... 384/446 |
| 5,211,261 A | * | 5/1993 | Garberg ....................... 184/5.1 |
| 5,302,032 A | * | 4/1994 | Niwa et al. .................. 384/454 |
| 6,619,851 B1 | * | 9/2003 | Vogelgesang ............... 384/475 |
| 6,739,757 B1 | * | 5/2004 | Kai et al. ..................... 384/488 |
| 6,783,137 B1 | * | 8/2004 | Nagreski et al. ....... 280/93.512 |

* cited by examiner

*Primary Examiner*—Paul N. Dickson
*Assistant Examiner*—Drew Brown
(74) *Attorney, Agent, or Firm*—Carrier, Blackman & Associates, P.C.; Joseph P. Carrier; William D. Blackman

(57) ABSTRACT

An improved apparatus is provided for use in a vehicular suspension arm. A through-hole is formed in one end of the suspension arm, and a bearing fits centrally in the through-hole. A pair of cylindrical spacer members are inserted into the opposed ends of the through-hole. Annular sealing members are interposed between the cylindrical spacer members and the through-hole. One end of the suspension arm is installed to the frame by means of a bolt inserted through the bearing and the cylindrical spacer members. At one end of each cylindrical spacer member, there is integrally molded a flange portion, having a larger outer diameter than the inner diameter of the through-hole. Using the described apparatus, it is possible to substantially prevent water splash, earth and sand from directly contacting the sealing member, in order to reduce the possibility of contamination.

10 Claims, 10 Drawing Sheets

SUSPENSION ARM KIT, VEHICLE WITH PROTECTIVE SPACER ON SUSPENSION ARM, AND METHOD OF INSTALLING SUSPENSION ARM

CROSS-REFERENCE TO RELATED APPLICATIONS

The present application claims priority under 35 U.S.C. 119 based on Japanese patent application No. 2002-322600, filed Nov. 6, 2002.

BACKGROUND OF THE INVENTION

1. Field of the Invention

The present invention relates to vehicular suspension arms. More particularly, the present invention relates to a suspension arm hardware kit, to a method of installing a suspension arm, and to a protective spacer for use with suspension arms. The apparatus hereof is suitable for substantially protecting an installation area of the suspension arm from contamination, preferably at a reduced cost.

2. Description of the Background Art

Virtually every four-wheeled vehicle sold today includes a suspension arm at each wheel thereof. Various types of hardware are known for use in conjunction with a suspension arm in a vehicle.

Methods of installing a suspension arm are known in which a suspension arm is installed on a vehicle frame through a bracket, such as for example, the method described in Japanese Utility Model Laid-Open No. 2-64408 (see, for example, p5 to p7 and FIG. 4).

With reference to FIG. 4 of Japanese Utility Model Laid-Open No. 2-64408, a method of installing the suspension arm has been described in the reference, in which a pivot portion 4a of the suspension arm has been installed to a side member 1 through a suspension bracket 5 (In the present discussion, reference numbers from the official gazette have been used).

The pivot portion 4a has a sleeve 4b, and a bolt 12 is inserted into this sleeve 4b to thereby install the suspension arm to the suspension bracket 5 in such a manner as to swing freely.

Alternative methods are also known in which a suspension arm is installed to the vehicle body side through a bushing assembly, such as that disclosed in Japanese Patent Publication No. 7-45890 (p3 to p4, FIG. 1). (In the present discussion, reference numbers from the official gazette have been used.) In FIG. 1 of Japanese Patent Publication No. 7-45890, a bushing assembly is shown, in which a supporting sleeve 8 is disposed between an inner sleeve 1 and an outer sleeve 2. An annular elastic member 9 is integrally interposed between this supporting sleeve 8 and the outer sleeve 2.

A sliding member 10, 11 is inserted between the inner sleeve 1 and the supporting sleeve 8, on each end thereof. End portions of the sliding members 10, 11 are regulated by flanges 6, 7 installed on an outer peripheral surface of the inner sleeve 1, in order to prevent these sliding members 10, 11 from coming off from the inner sleeve 1. Brackets 16, 16 are installed on the ends of the inner sleeve 1, by means of a respective nut and bolt. The bolt 17 is inserted within the inner sleeve 1, and a nut is screwed into the end portion of the bolt 17.

Cylindrical seal fittings 12, 13 are installed on both end portions of the supporting sleeve 8, so as to go beyond the respective flanges 6, 7. Seals 14, 15 are installed between the end portions of these seal fittings 12, 13 and the inner sleeve 1.

In the technique of Japanese Utility Model Laid-Open No. 2-64408 described above, since no sealing member is provided for sealing between the bolt 12 and the sleeve 4b of the pivot portion 4a, rainwater, dust and the like are allowed to enter between the bolt 12 and the sleeve 4b.

A structure in which a suspension arm is installed on the vehicle body using a bushing assembly is described in Japanese Patent Publication No. 7-45890 (see, for example, pages 3–4 and FIG. 1 of this reference). In the technique described in Japanese Patent Publication No. 7-45890, the protection from contamination is high, but the described apparatus for enhancing the protection from contamination becomes complicated, the number of parts is increased, and the assembly becomes complicated, resulting in relatively high cost.

Although the known devices have some utility for their intended purposes, a need still exists in the art for improving the ancillary hardware for use in connection with the suspension arm. In particular, there is a need for an improved spacer apparatus for use in connection with the suspension arm, for enhancing the protection from contamination of the installation area of suspension arm and for reducing cost of improving the protection from contamination.

SUMMARY OF THE INVENTION

In order to achieve the above-described object, in a first aspect of the present invention, an improved method of installing the suspension arm is provided, in which a cylindrical hole is bored in one end of the suspension arm. A bearing is installed into this cylindrical hole, and a sealing member is installed into each end of the cylindrical hole. A pair of spacer collars for regulating movement of this bearing are inserted through the sealing members at both ends of the cylindrical hole. A bolt is then inserted through the bearing and the pair of spacer collars. The bolt also passes through a body-side bracket attached to the vehicle frame, thereby connecting one end of the suspension arm to the frame. On one end of the collar, there is provided an integrally molded flange having a larger outer diameter than the inner diameter of the cylindrical hole, and this flange protectively covers and blocks the cylindrical hole.

With a simple apparatus in which at one end of the collar, there is an integrally molded flange, it is possible to prevent water, earth and sand from directly contacting the sealing member for improving the protection from contamination, and reduce the costs of improving the protection from contamination.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIGS. 10(a) and 10(b) are operation views for explaining operation of the described apparatus for installing the suspension of the vehicle in which FIG. 10(a) shows a known prior art design, and FIG. 10(b) illustrates a structure according to an illustrative embodiment of the present invention.

DETAILED DESCRIPTION OF THE PREFERRED EMBODIMENTS

In the present disclosure, selected illustrative embodiments of the present invention will be described, with reference to the accompanying drawings. The described embodiments are provided as one example of a way to practice the present invention, and are given to enable one in the art to practice one aspect of the invention. However, it should be understood that the following description is provided to illustrate, rather than to limit the invention.

Figure 1:
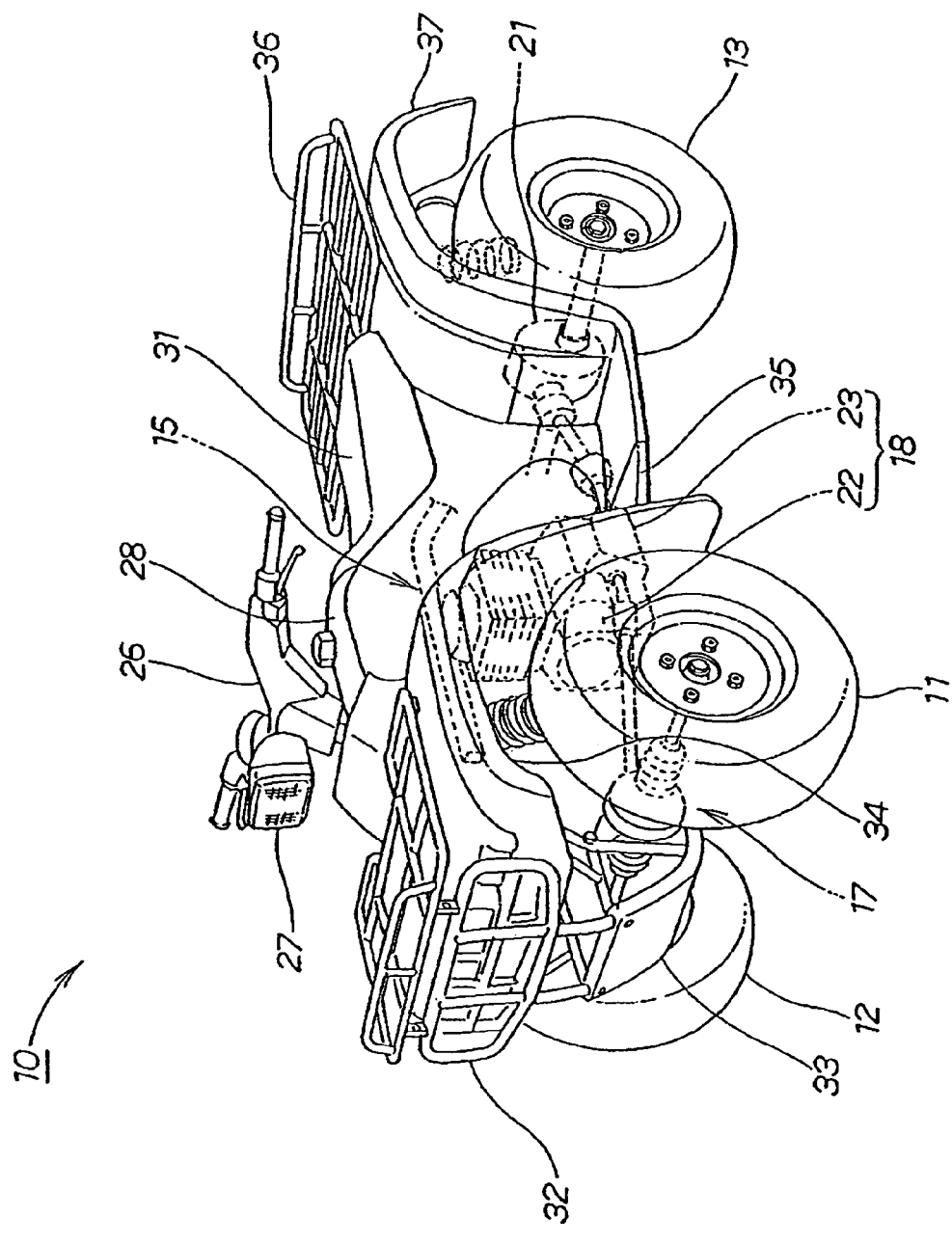
FIG. 1 is a perspective view showing a vehicle in which an apparatus for installing a suspension arm according to the present invention has been adopted.
Figure 2:
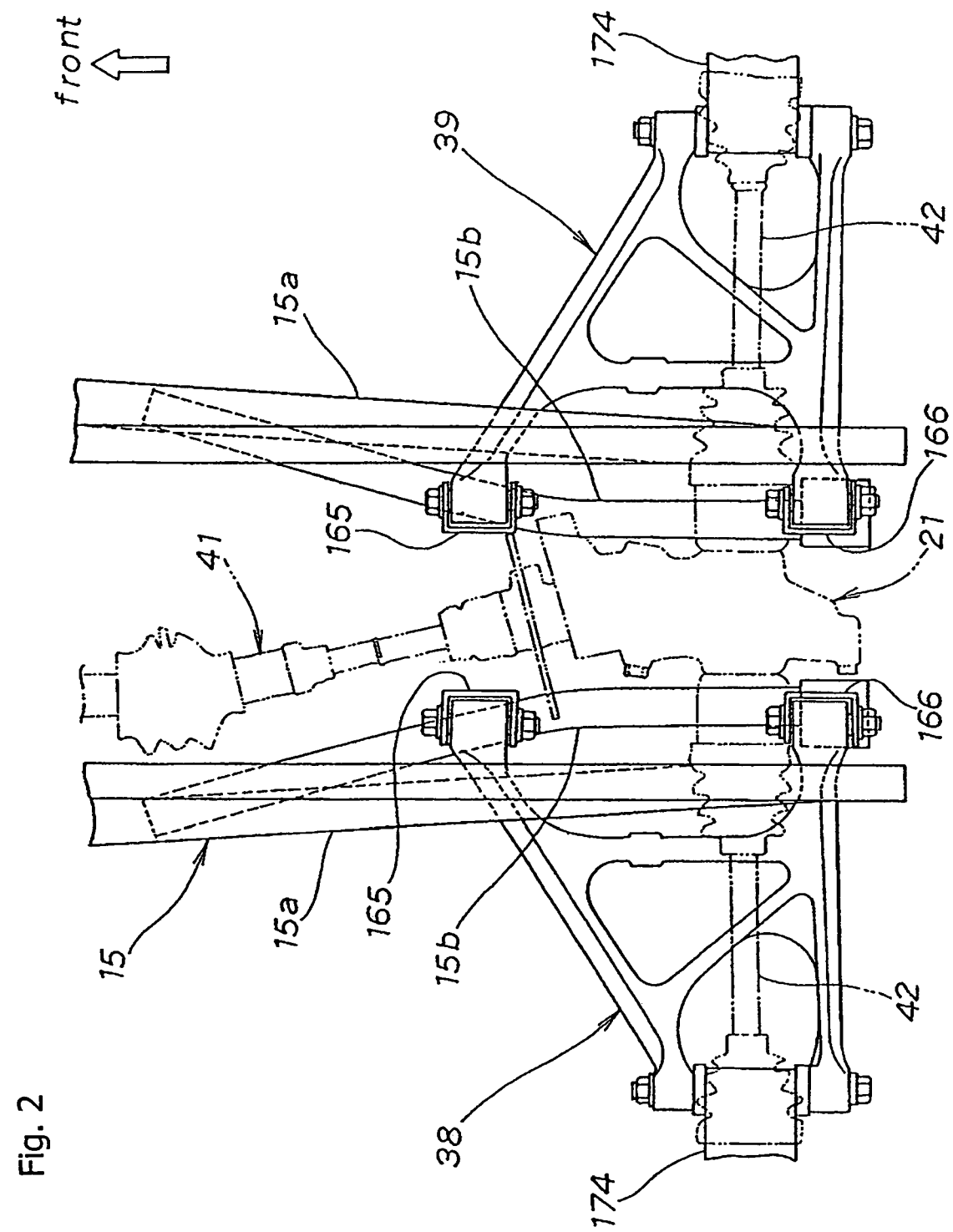
FIG. 2 is a top plan view of a rear suspension portion of the vehicle frame, partially cut away, and showing a suspension arm according to a selected illustrative embodiment of the present invention.

FIG. 1 is a perspective view of a vehicle 10, for which an apparatus for installing a suspension arm according to the present invention has been adopted. The depicted vehicle 10 is an all-terrain type vehicle for running on uneven terrain. On the vehicle 10, left and right front wheels 11, 12 and left and right rear wheels 13, 14 (rear wheel 14 at the back is not shown) are each supported by a respective suspension arm (examples of suspension arms 38, 39 are shown in FIG. 2). Each of the suspension arms is pivotally installed to a frame 15 on a body side portion, respectively, in such a manner as to be freely vertically movable within a limited range of travel.

The front wheels 11, 12 are operatively connected to a powertrain 18, located substantially at the center of the vehicle, through a front reduction gear 17. The rear wheels 13, 14 are coupled to the powertrain 18 through a rear reduction gear 21.

The powertrain 18 includes an engine 22 and a transmission 23 coupled to an output shaft of the engine 22. In this case, reference numeral 26 designates a steering handlebar mechanism for steering the front wheels 11, 12. Reference numeral 27 designates a headlamp, which is centrally mounted on the steering handlebar mechanism 26. Reference numeral 28 designates a fuel tank.

The vehicle 10 is also provided with a seat 31; a front guard 32 for protecting the front of the vehicle body; and a front underbody cover 33 for protecting a front-side suspension and a power transmission system.

The vehicle 10 is further provided with a front fender 34 for covering the upper part and rear part of the respective front wheels 11, 12, and a rear fender 37 for covering the front and upper parts of the respective rear wheels 13, 14. A step 35, on which a driver puts his foot to enter the vehicle, is provided on a side of the vehicle body, and the vehicle 10 is also provided with a rear luggage rack 36.

FIG. 2 is a top plan view of a rear portion of the vehicle frame, partially cut away, and showing a suspension arm according to the present invention. The vehicle frame 15 includes left and right main frame sections 15a, 15a for extending in a longitudinal direction of the vehicle body. The frame 15 also includes a pair of rear sub-frames 15b and 15b respectively, attached to the respective main frame sections 15a, 15a.

A pair of suspension arms 38, 39 are pivotally attached to these respective rear sub-frames 15b and 15b, for supportively suspending the rear wheels 13, 14.

The rear end of the propeller shaft 41 is coupled to the rear reduction gear 21, and a pair of left and right drive shafts 42, 42 extend from the rear reduction gear 21 to each of the left and right rear wheels 13, 14 respectively.

Figure 3:
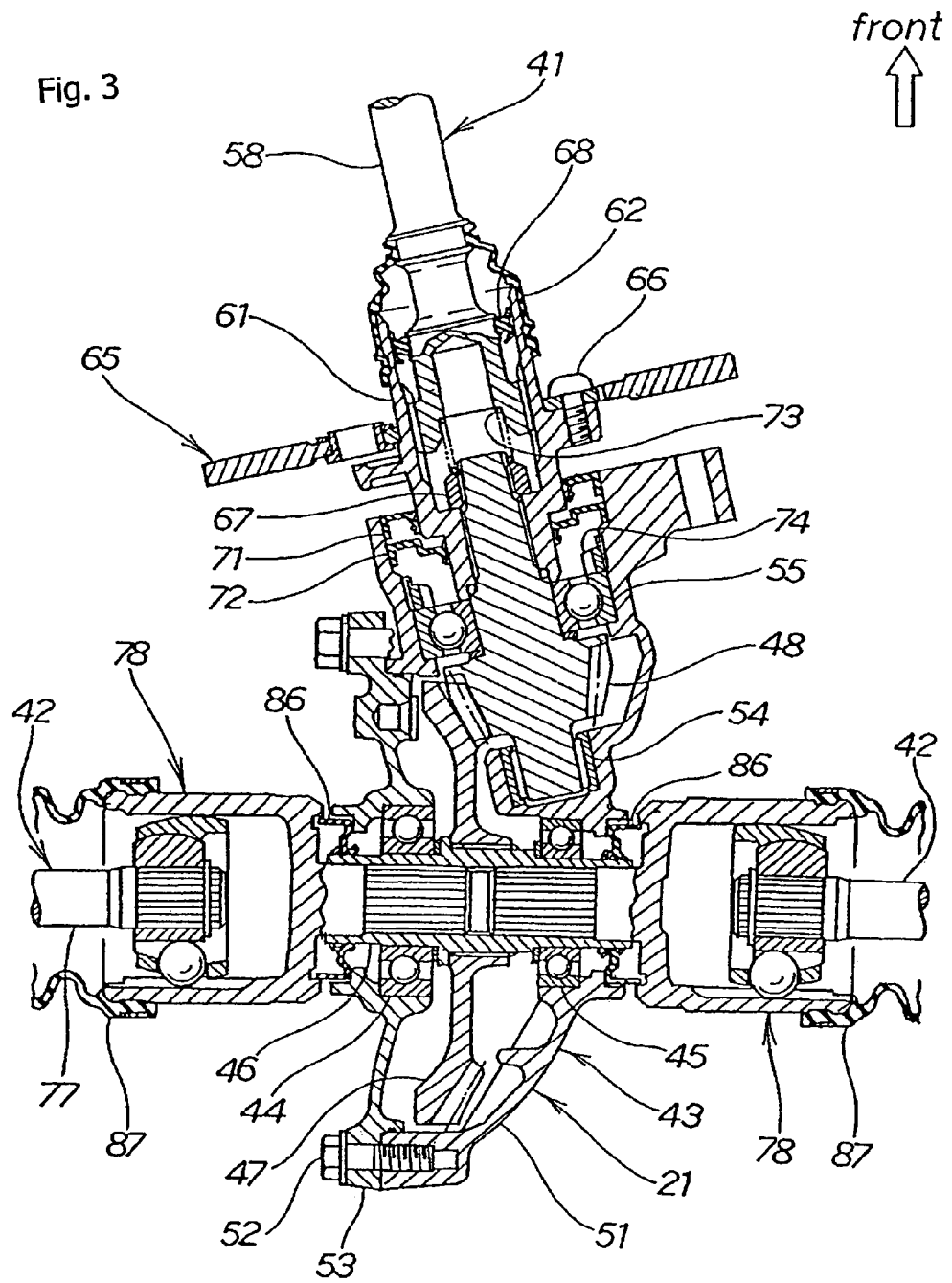
FIG. 3 is a sectional view showing an area around a rear reduction gear of the vehicle according to the embodiment of FIG. 2.

FIG. 3 is a sectional view showing an area around the rear reduction gear 21 of the vehicle 10, according to the embodiment of FIGS. 1–2. The rear reduction gear 21 includes a case 43, a hollow sleeve 46 which is rotatively supported by this case 43 through bearings 44, 45, a first bevel gear 47 spline-coupled to the outer peripheral surface of this hollow sleeve 46, and a second bevel gear 48 for meshing with the first bevel gear 47.

The case 43 includes a case body 51 and a case cover 53 installed to this case body 51 by a plurality of bolts 52. The above-described second bevel gear 48 is rotatively supported by the case body 51 through bearings 54, 55.

The propeller shaft 41 includes a propeller shaft body 58, a joint member 61 spline-coupled to the rear end of this propeller shaft body 58; and a rubber boot 62 for covering a coupled portion between these propeller shaft body 58 and joint member 61.

The joint member 61 is fixedly connected to a brake disk 65 with threaded fasteners 66, for constituting a major part of a disk brake assembly 70. The joint member 61 is also spline-coupled to the front end of a second bevel gear 48, and also is fixed thereto with a center nut 67. The brake disk 65 is sandwiched between calipers (not shown), whereby the propeller shaft 41 is able to be braked, as needed. In this respect, reference numerals 68, 71, 72 designate respective dust seals; 73 represents a spring; and 74, a bearing-retention nut.

A drive shaft 42 has one end spline-coupled to an inner peripheral surface of the hollow sleeve 46 and has a constant-velocity universal joint 78 in which the other end is coupled to the drive shaft body 77, and the other end side of the drive shaft body 77 is coupled to the rear wheel 13 or 14 through another constant-velocity universal joint (not shown). In this respect, reference numeral 86 designates a dust seal; and 87, a rubber boot.

Figure 4:
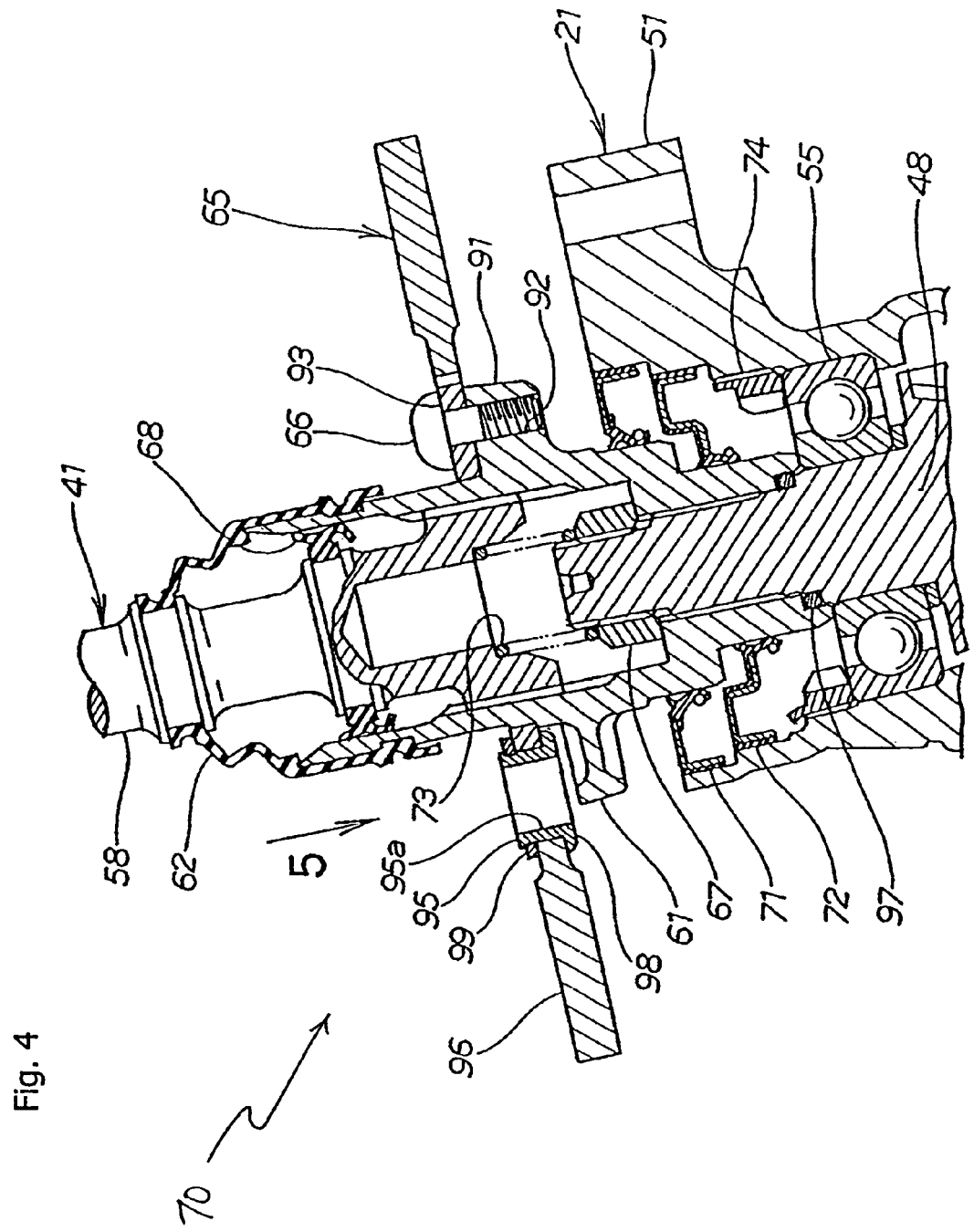
FIG. 4 is a principal part enlarged sectional view for explaining a brake disk apparatus of the vehicle according to the embodiment of FIGS. 2–3.

FIG. 4 is an essential enlarged sectional view for explaining the brake disk assembly 70 of the vehicle according to the present invention, and shows a state in which on the outer surface of the joint member 61, there are provided external protruded portions, 91; on these external protruded portions 91, there are formed internal threaded bores 92 respectively. A reduced-diameter disk 93 is installed to the external protruded portions 91 by screwing bolts 66 into the internal threaded bores 92 respectively. A disk 96 of major diameter is installed to this reduced-diameter disk 93 of minor diameter 93 with rivets 95 or other appropriate fasteners. In this respect, reference numeral 97 designates an O-ring.

The above-described reduced-diameter disk 93, rivets 95 and disk 96 of major diameter 96 are components of the above-described brake disk assembly 70.

The rivet 95 is a flanged cylindrical member obtained by integrally molding a flange 98 at one end, and is a member obtained by fitting an annular member 99, between the reduced-diameter disk 93 and the disk 96 of major diameter, over the end of the flanged cylinder opposite the flange 98, and expanding the other end of the flanged cylinder with the annular member 99 thereon. In the drawing, reference numeral 95a designates a hollow central portion of the rivet 95.

Figure 5:
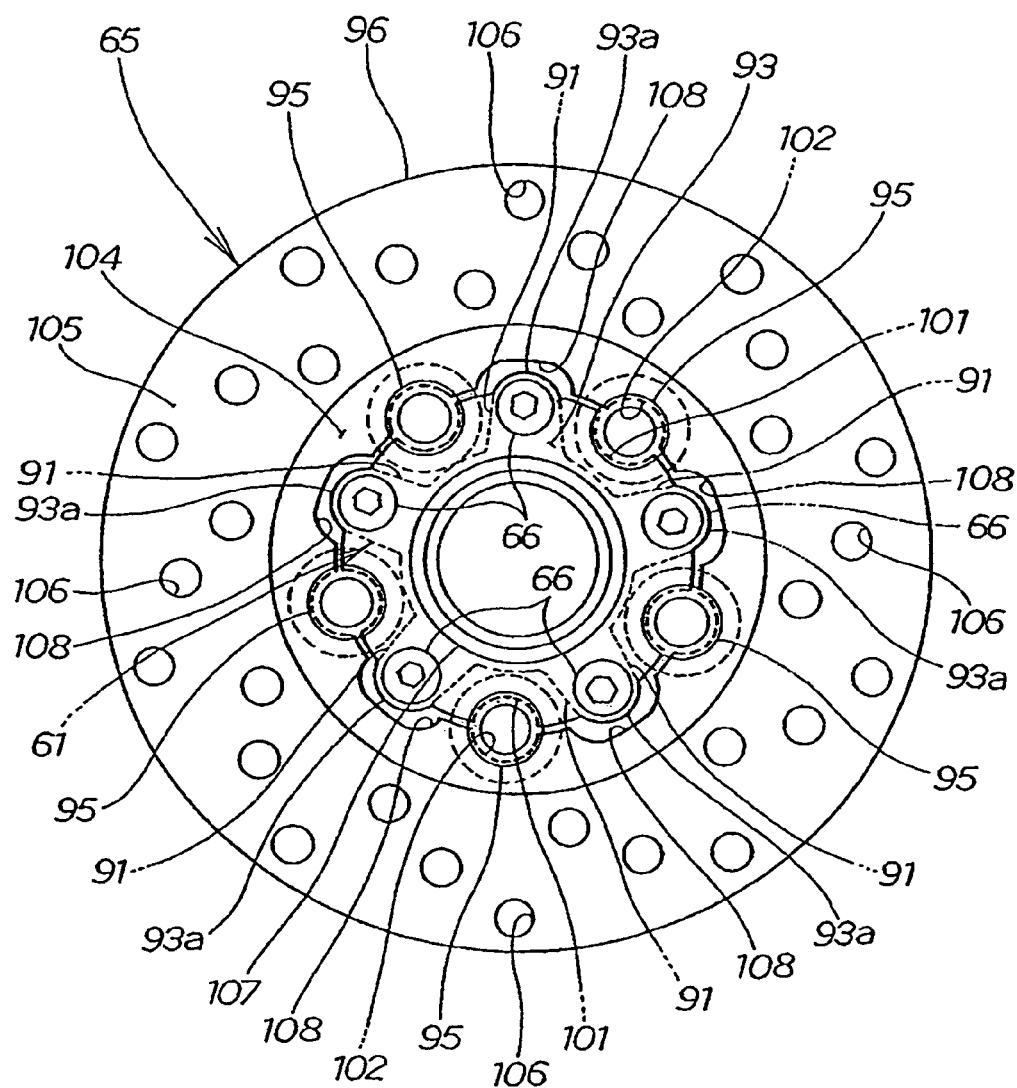
FIG. 5 is a front plan view of a brake disk, taken in the direction of the arrow 5 in FIG. 4.

FIG. 5 is a simplified front plan view of the brake disk assembly 70, taken in the direction of the arrow 5 in FIG. 4. As seen in FIG. 5, the reduced-diameter disk 93 of the brake disk assembly 70 is provided with circular-arc shaped outer peripheral notched portions 101, at the outer peripheral edge thereof. The disk 96 of major diameter is provided with circular-arc shaped inner peripheral notched portions 102, at an inner peripheral edge thereof corresponding to the outer peripheral notched portions 101 of the reduced-diameter disk portion 93. The rivets 95 are staked at these outer peripheral notched portions 101 and inner peripheral notched portions 102, respectively, to thereby couple the reduced-diameter disk 93 to the disk 96 of major diameter. Therefore, the reduced-diameter disk 93 and the disk 96 of major diameter are spaced slightly apart from one another, with the exception of the rivets 95.

The disk 96 of major diameter includes a coupled portion 104 toward the side of the reduced-diameter disk 93 and an annular sliding portion 105 provided in the outside of the diameter of the coupled portion 104 to cause braking by sandwiching the annular sliding portion 105 between calipers. In this respect, reference numeral 106 designates through-holes bored in the annular sliding portion 105 in order to increase the braking force and the cooling performance; boss 107 of the joint member 61; and inner peripheral run-off 108 provided on the inner peripheral edge of the disk 96 of major diameter in order to avoid an interference of the reduced-diameter disk 93 adjacent to the external protruded portion 91 of the joint member 61 with an outward crook 93a.

Next, the operation of the above-described brake disk assembly 70 will be described.

Figure 6A:
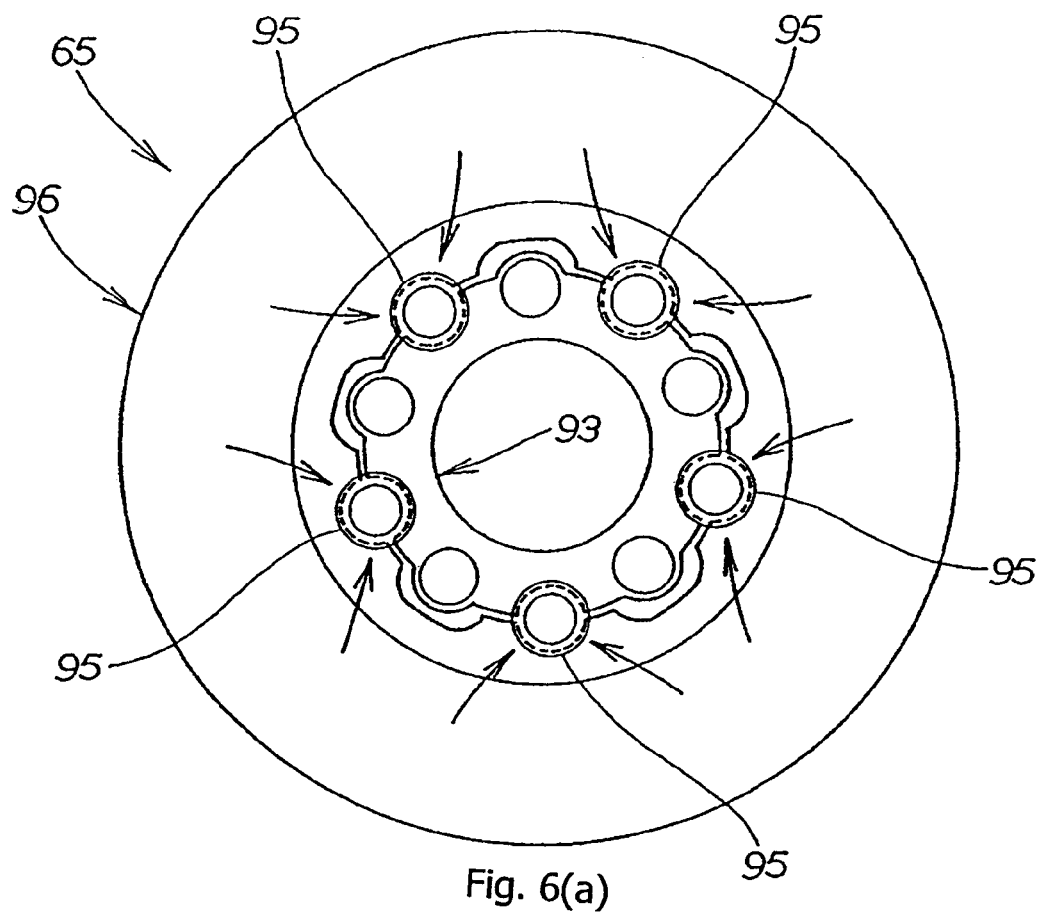
FIG. 6(a) is a front view for explaining an operation of the brake disk of the vehicle according to the selected embodiment.
Figure 6B:
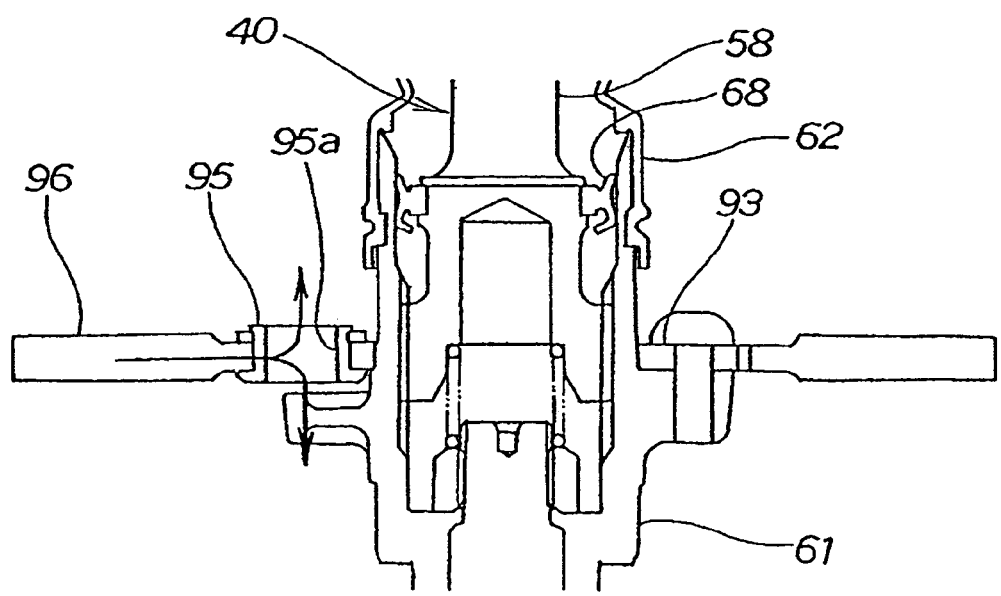
FIG. 6(b) is a sectional view of brake disk of the vehicle provided for explaining operation thereof according to the selected embodiment.

FIGS. 6(a) and 6(b) are operation views explaining an operation of the brake disk of the vehicle according to the present invention. FIG. 6(a) is a front view and FIG. 6(b) is a sectional view.

In FIG. 6(a), during braking, the disk 96 of major diameter is sandwiched between calipers and generates heat by sliding. This heat is conducted from the disk 96 of major diameter to the reduced-diameter disk 93 through the rivets 95 as shown by an arrow.

In FIG. 6(b), when the heat is conducted within the coupling tool 95, the heat is radiated from the hollow portion 95a of the coupling tool 95 into the atmosphere. If airflow is present within this hollow portion 95a, heat radiation will be further accelerated to enable heat transmission to the side of the reduced-diameter disk 93 to be suppressed. Therefore, it is possible to suppress an increase in temperature of the joint member 61, and to prevent, for example, the dust seal 68 and the rubber boot 62 from being negatively affected by the heat.

Figure 7:
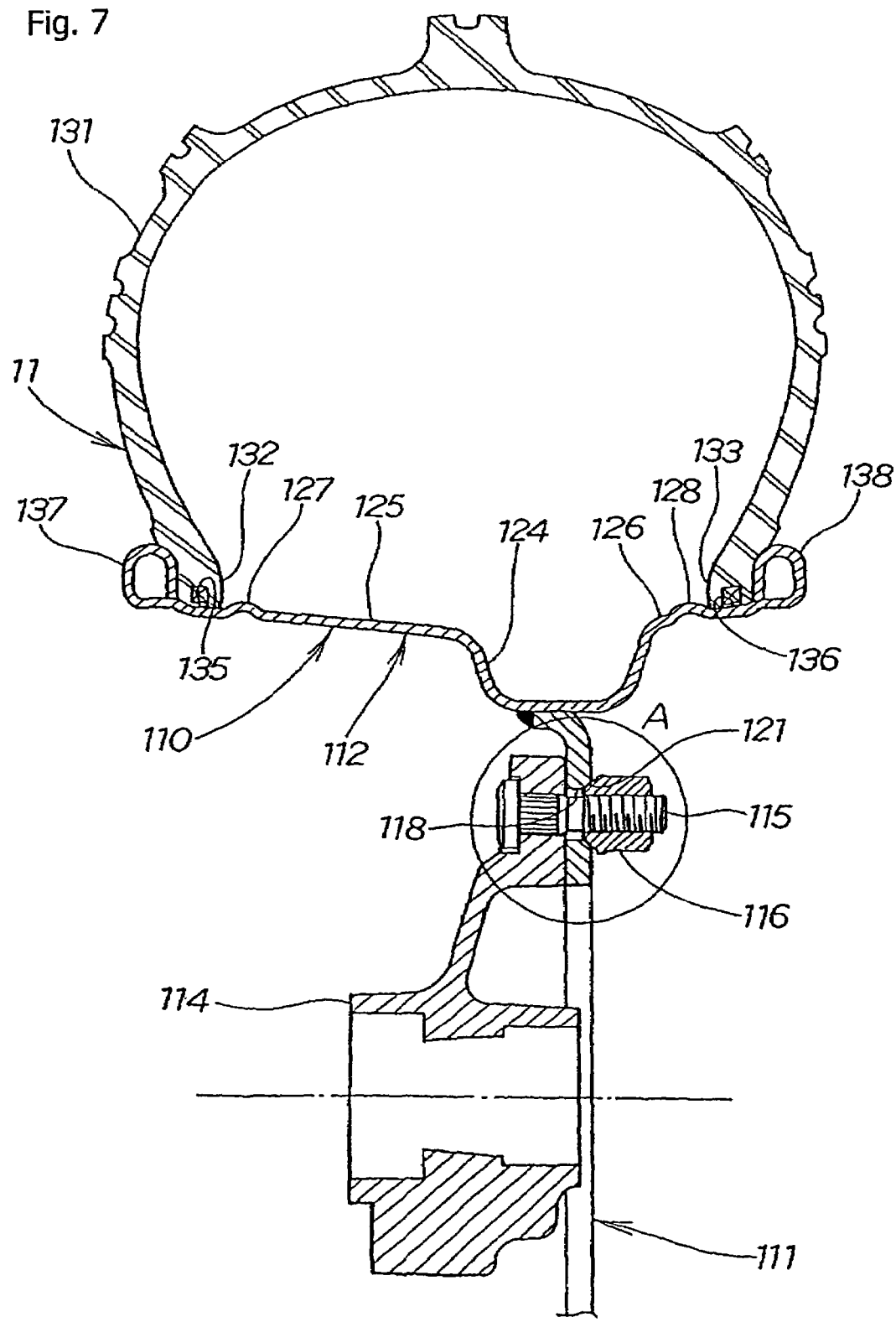
FIG. 7 is a sectional view for explaining a wheel of the vehicle according to the selected embodiment.

FIG. 7 is a sectional view for explaining a wheel of the vehicle according to the present invention, and shows that a wheel 110 constituting the front wheel 11, 12 (as regards the front wheel 12, See FIG. 1) includes: a wheel disk portion 111; and a rim portion 112 installed to the outer periphery of this wheel disk portion 111. In this respect, reference numeral 114 designates a hub coupled to the front reduction gear 17 (See FIG. 1) through a drive shaft (not shown). Reference number 115 designates a plurality of bolts installed to the hub 114; and reference number 116 designates a wheel lug nut for installing the wheel 110 to the hub 114 by attaching the lug nut 116 to the bolt 115.

The wheel disk portion 111 is substantially flat, and a plurality of through-holes 118 are formed through this wheel disk portion 111. The above-described bolt 115 is inserted through one of the through-holes 118, and in the vicinity of this bolt through-hole 118, there is formed a chamfered seat 121, which seats the tip of the above-described wheel lug nut 116.

The rim portion 112 includes: a rim drop portion 124 provided substantially at the central portion; tapered portions 125, 126 provided on both sides of this rim drop portion 124; a hump portion 127, 128 heaped up and molded at the end portions of these tapered portions 125, 126; bead seat portions 135, 136 formed at the outside of hump portions 127, 128 in order to hold the inner periphery side of the bead portions 132, 133 of a tire 131 for constituting the front wheel 11; and curled portions 137, 138 for holding the outer side surface of the bead portion 132, 133 of the tire 131 by curling the ends of these bead seat portions 135, 136.

The rim drop portion 124 is a portion, in which the bead portion 132, 133 of the tire 131 is caused to drop when detaching and attaching the tire 131.

The hump portion 127, 128 is an annular protruded portion for preventing the tire 131 from coming off from the bead seat portion 135, 136.

The above-described apparatus of the wheel 110 may be also adopted for the rear wheel 13, 14 (See FIG. 1).

Figure 8:
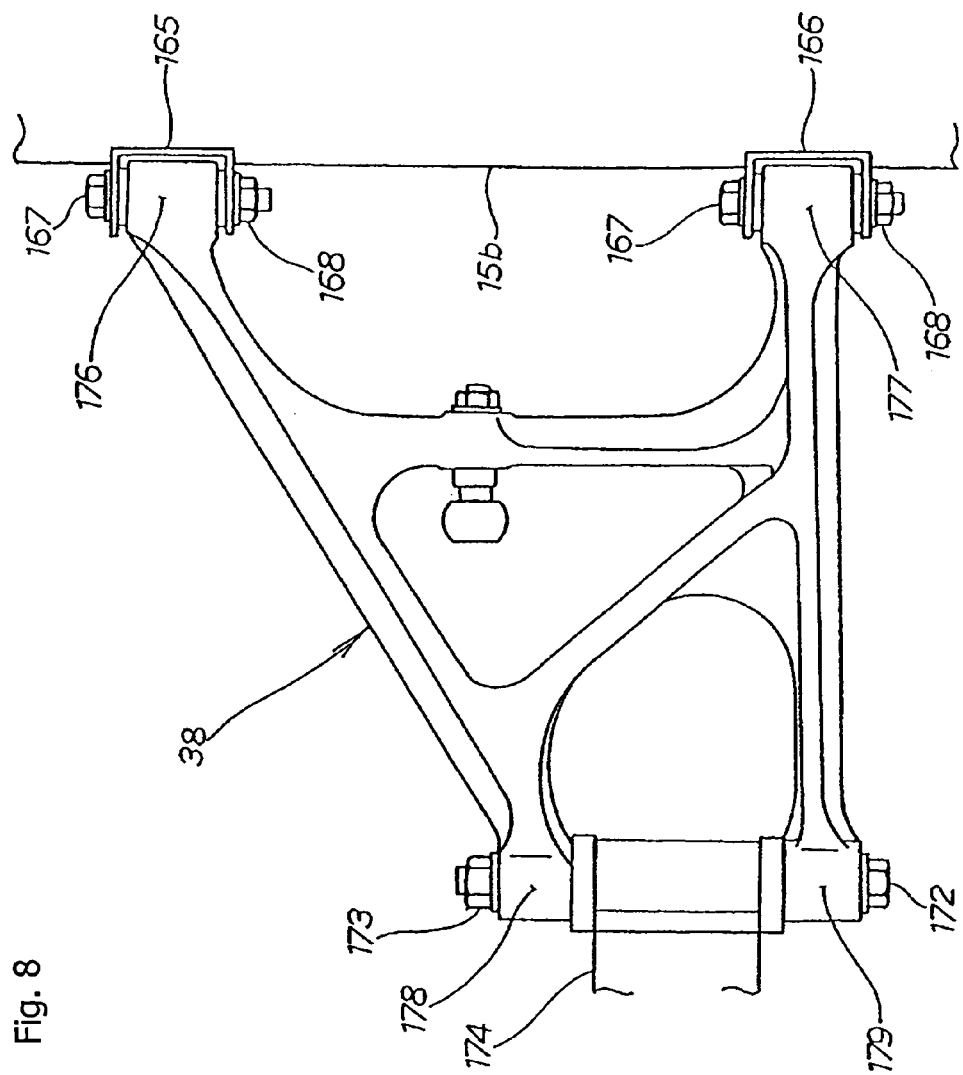
FIG. 8 is a plan view for explaining the suspension arm of the vehicle according to the selected embodiment of the present invention.

FIG. 8 is a plan view for explaining the suspension arm of the vehicle according one embodiment of the present invention, and shows a state in which brackets 165, 166 have been arranged before and behind to be installed on a rear sub-frame 15b. A substantially A-shaped suspension arm 38 is pivotally connected to these brackets 165, 166 with a bolt 167 and a nut 168 respectively. The narrow tip end of this suspension arm 38 is pivotally installed on a knuckle 174 with a bolt 172 and a nut 173. The knuckle 174 is a member to which the hub 114 (See FIG. 7) is rotatively installed.

Since the suspension arm 39 (See FIG. 2) is a bilaterally symmetrical part to the suspension arm 38, and is also installed in a similar manner to the other rear sub-frame 15b, the detailed description of the second suspension arm 39 will be omitted.

In FIG. 8, reference numeral 176, 177 designates an inboard installation area of the suspension arm 38 to be installed to the frame bracket 165, 166 respectively, and 178, 179, a knuckle-side installation area to which the knuckle 174 is installed.

Figure 9:
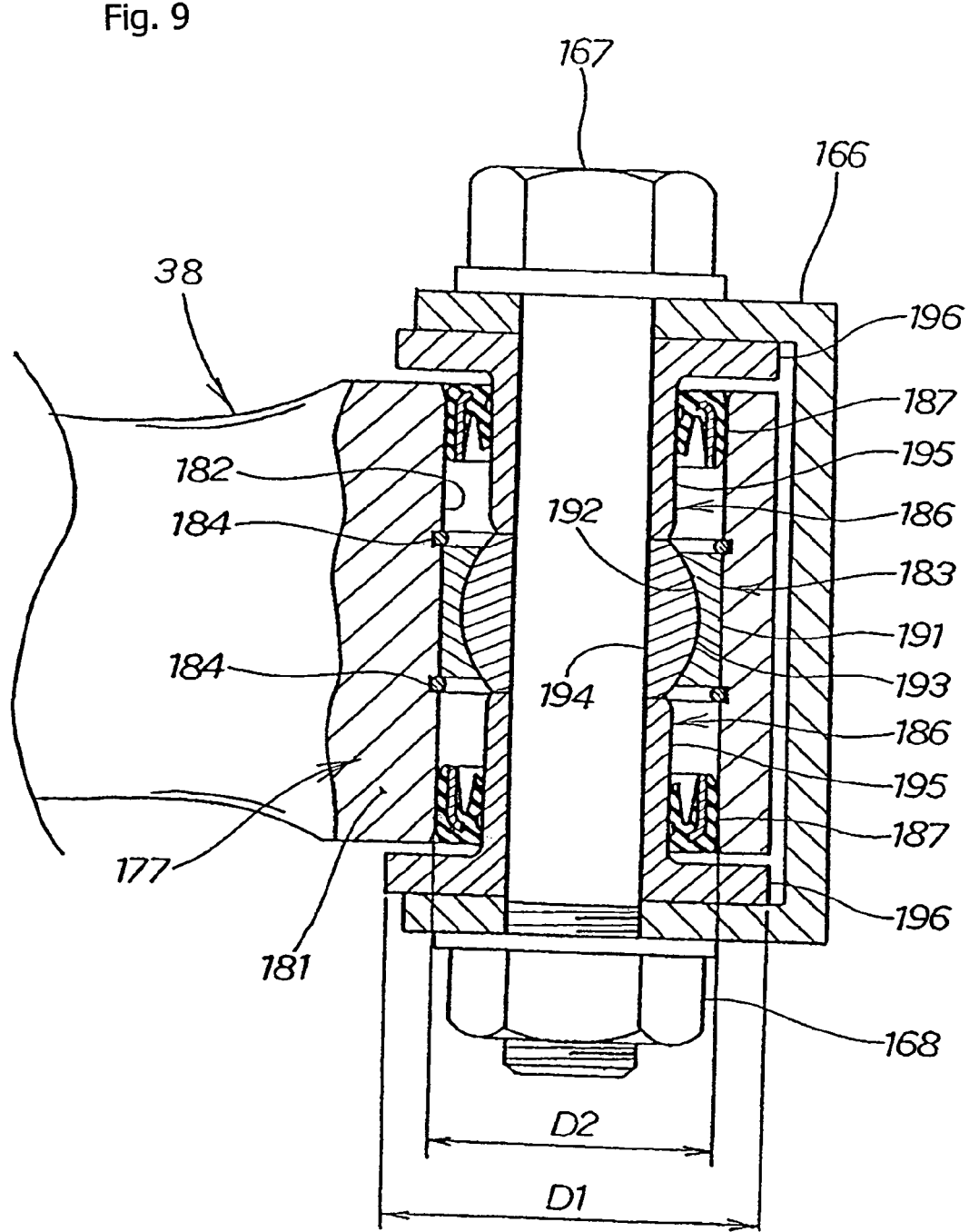
FIG. 9 is a sectional view showing a principal part of a suspension arm of the vehicle according to the selected embodiment.

FIG. 9 is a sectional view showing a principal part of the suspension arm of the vehicle according to the present invention, and shows cross sections of the inboard installation area 177 of the suspension arm 38 and the frame bracket 166.

The inboard installation area 177 is a portion obtained by screw-coupling the nut 168 to the tip end of the bolt 167 after the following steps: a cylindrical through-hole 182 is bored in an end portion 181 of the suspension arm 38, as noted, and a spherical sliding bearing 183 with rings 184, 184 is installed in this through-hole 182. Each side portion of this spherical sliding bearing 183 is sandwiched between cylindrical spacer members 186, 186 as a flanged collar. Sealing members 187, 187 are interposed between these cylindrical spacer members 186, 186 and the suspension arm the inner surface of the through-hole 182, as shown (It will be understood that the sealing members 187 must be installed prior to, or concurrently with the installation of the spacer members 186). The bolt 167 is inserted through the bracket 166, the cylindrical spacer members 186, 186 and the spherical sliding bearing 183.

The spherical sliding bearing 183 includes an outer race 191 on the side of the through-hole 182; and an inner race 194, with an outer surface formed substantially in the shape of a convex sphere 193, which has been slidably fitted in a hollow concave sphere 192 formed within this outer race 191.

The cylindrical spacer member 186 is a member in which a cylindrical portion 195 is integrally molded with a flange portion 196, and an outer diameter D1 of the flange portion 196 is made larger than an inner diameter D2 of the through hole 182.

Next, the installation of the above suspension the suspension will be described, with reference to FIGS. 10(a) and 10(b).

Figure 10B:
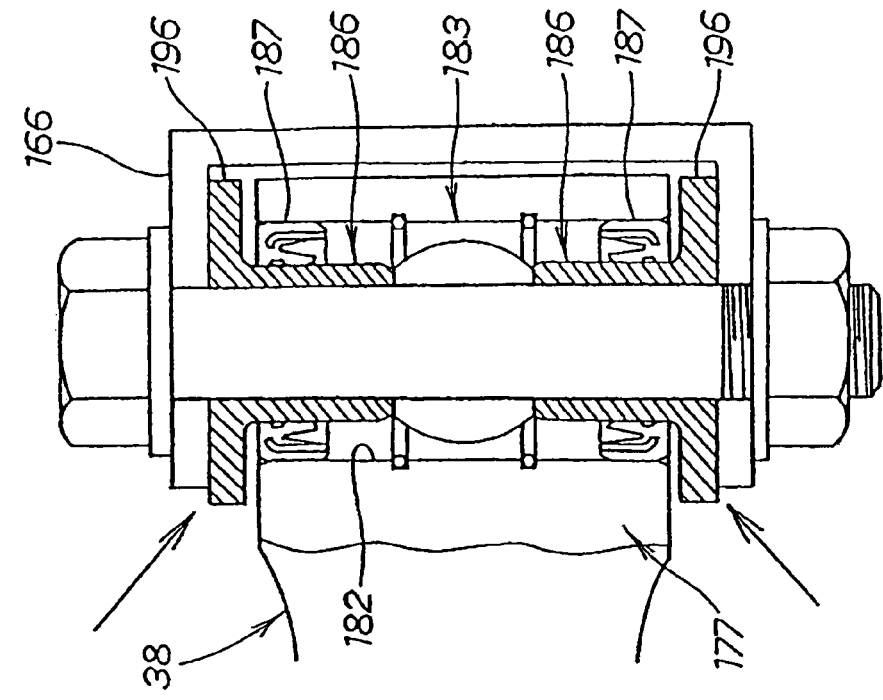
Figure 10A:
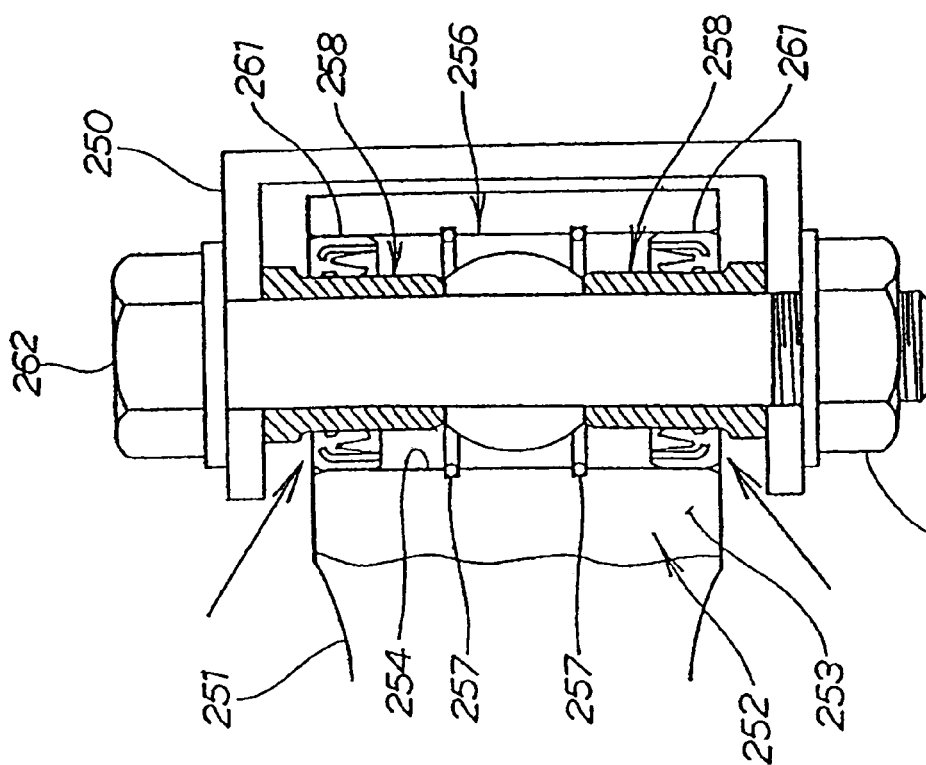

FIGS. 10(a) and 10(b) are operation views for explaining the operation of the apparatus of installing the suspension of the vehicle, and a comparative example shown in FIG. 10(a) will be compared with the present embodiment shown in FIG. 10(b).

FIG. 10(a) shows a comparative example of the apparatus of installing the suspension, and shows an inboard installation area 252 of the suspension arm 251 installed to the body-side bracket 250 in such a manner as to be freely pivotally movable thereon.

The inboard installation area 252 is a portion obtained by screw-coupling the nut 263 to the tip end of the bolt 262 after the following steps: a through-hole 254 is bored in an arm end portion 253 of the suspension arm 251. A spherical sliding bearing 256 with rings 257, 257 is installed within this through-hole 254, and this spherical sliding bearing 256 is sandwiched between cylindrical spacer members 258, 258. Sealing members 261, 261 are interposed between these cylindrical spacer members 258, 258 and the inner surface of the through-hole 254, and a bolt 262 is inserted through the bracket 250, the cylindrical members 258, 258 and the spherical sliding bearing 256.

In the known design of FIG. 10(a), for example, water splashed when the vehicle is passing through a puddle or the like splashes directly on a sealing member 261, situated between a through-hole 254 of the inboard installation area 252 and the cylindrical spacer member 258, as shown by an arrow. Therefore, if the force of the water is strong, there is a possibility that the sealing member 261 may be contaminated or compromised by such water splashing, especially if it occurs repeatedly over an extended time period.

In FIG. 10(b), in the present embodiment, since the cylindrical spacer member 186 in the inboard installation area 176, 177 (as regards one symbol 176, see FIG. 8) has been provided with a flange portion 196 and the outer diameter of this flange portion 196 has been made larger than the inner diameter of the through-hole 182. Accordingly, even if water splash comes from a direction indicated by an arrow, the flange portion 196 prevents the water splash from directly splashing on the sealing member 187. Therefore, it is possible to substantially protect the sealing members 187 from contamination at the inboard installation area 176, 177 and to enhance the reliability thereof.

Since the body installation area 176, 177 according to the present embodiment is constructed such that by means of the spherical sliding bearing 183, the suspension arm 38 is inclined, for example, in the up-and-down direction of the drawing with respect to the body side, that is, the frame bracket 165, 166 (for the frame bracket 165, see FIG. 8), a clearance between the outer peripheral surface of the cylindrical spacer member 186 and the inner peripheral surface of the through-hole 182 changes as the suspension arm 38 is inclined so that the sealing member 187 is partially pressed and squeezed or expanded. When one portion of the sealing member 187 is expanded, a pressing force when a lip portion of the sealing member 187 presses the outer peripheral surface of the cylindrical spacer member 186 reduces to lower the protection from contamination of the sealing member 187.

In other words, the flange portion 196 of the cylindrical spacer member 186 according to one embodiment of the present invention is constructed so as to supplement this lowered protection from contamination, and as compared with, for example, apparatus in which a suspension arm is hardly inclined with respect to the body side, particularly such apparatus in which the suspension arm is inclined with respect to the body side as described above exhibits a great effect.

As described in the above-described FIGS. 8 and 9, there is provided apparatus of installing a suspension arm 38 according to the present invention, in which at one end of the suspension arm 38, there is bored the through-hole 182; into this through-hole 182, there is inserted the spherical sliding bearing 183; a pair of cylindrical spacer members 186 for regulating movement of this spherical sliding bearing 183 are inserted through both apertures of the through-hole 182; between these cylindrical spacer members 186 and the through-hole 182, there are interposed sealing members 187, 187; and by means of the bolt 167 and the nut 168 which penetrate the spherical sliding bearing 183 and the pair of cylindrical spacer members 186, one end of the suspension arm 38 is installed to the frame bracket 165, 166 installed to the frame 15, included at one end of the cylindrical spacer member 186, there is integrally molded the flange portion 196 having a larger outer diameter D1 than the inner diameter D2 of the through-hole 182 and the through-hole 182 is blocked by this flange portion 196.

With simple apparatus in which at one end of the cylindrical spacer member 186, there is integrally molded the flange portion 196, it is possible to prevent water splash, earth and sand from directly splashing on the sealing member 187 for improving the protection from contamination, and to reduce a number of parts without necessitating complicating the apparatus in order to improve the protection from contamination. Also, it is easy to assemble and any increase in cost can be minimized.

The one embodiment of the present invention exhibits the following advantages by the above-described apparatus.

Since as the apparatus of installing the suspension arm according to claim 1, it has been arranged such that at one end of the collar, there is integrally molded the flange having a larger outer diameter than the inner diameter of the cylindrical hole and this flange blocks the cylindrical hole, with simple apparatus in which at one end of the collar, there is integrally molded the flange, it is possible to prevent water splash, earth and sand from directly splashing on the sealing member, to improve the protection from contamination and to suppress any increase in cost.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having thus, described the invention, what is claimed is:

1. A structure for use in attaching a suspension arm to a frame bracket, in which a cylindrical hole is bored in one end of the suspension arm, and a bearing is inserted into the cylindrical hole; a pair of spacer collars is inserted into the ends of said cylindrical hole for regulating movement of the bearing; a sealing member is interposed between the spacer collars and the cylindrical hole; and one end of said suspension arm is installed to the frame bracket by means of a bolt inserted through said bearing and said pair of spacer collars, characterized in that each of said spacer collars includes:
    a substantially cylindrical tube portion for receiving said bolt therethrough, and
    an integral flange attached to an end of the cylindrical tube portion and extending outwardly therefrom;
    wherein in an installed configuration of said structure, said integral flange is disposed between said suspension arm and said frame bracket, said integral flange having a larger outer diameter than an inner diameter of said cylindrical hole,
    and wherein this integral flange substantially covers said cylindrical hole.

2. A vehicle having the attaching structure of claim 1 installed into suspension arm joints thereof.

3. The attaching structure of claim 1, wherein said bearing assembly comprises:
    a pair of outer races each having a semi-cylindrical shape with a concave cutout formed therein on one side thereof;
    a substantially spherical ball having a cylindrical through hole, said ball disposed between said outer races; and,
    a pair of retainer rings disposed outside of said outer races.

4. A method of installing a suspension arm on a frame bracket, in which said suspension arm has an end portion with a cylindrical hole formed therethrough, said method comprising the steps of:
    inserting a bearing assembly into the cylindrical hole in said suspension arm;
    installing an annular sealing member into each end of said cylindrical hole, respectively,
    inserting a substantially cylindrical tube portion of a spacer collar through each of said sealing members and into the respective opposite ends of said cylindrical hole, each of said spacer collars comprising a substantially cylindrical tube portion and an integrally molded flange attached to an end of said tube portion and extending outwardly therefrom, said flange having a larger outer diameter than an inner diameter of said cylindrical hole, said spacer collars being provided for restricting movement of said bearing and for protectively covering the ends of said cylindrical hole;
    aligning said end portion of said suspension arm with said frame bracket; and
    inserting a bolt through said bearing and said pair of spacer collars, and threading a nut onto said bolt;
    whereby said outwardly extending flanges of said spacer collars fit into spaces between said suspension arm and said frame bracket and substantially block said ends of said cylindrical hole.

5. The method of claim 4, wherein said outwardly extending flange of each of said spacer collars is substantially transverse to said tube portion thereof.

6. The method of claim 4, wherein said spacer collars are formed of a corrosion-resistant material.

7. The method of claim 4, wherein said bearing assembly comprises:
    a pair of outer races each having a semi-cylindrical shape with a concave cutout formed therein on one side thereof,
    a substantially spherical ball having a cylindrical through hole, said ball disposed between said outer races; and,
    a pair of retainer rings disposed outside of said outer races.

8. A hardware kit for use in connecting a suspension arm having a cylindrical hole formed therein to a vehicle frame bracket, said hardware kit comprising:
    a bearing,
    a pair of annular sealing members, and
    a pair of spacer collars,
        wherein said bearing comprises:
            a pair of outer races each having a semi-cylindrical share with a concave cutout formed therein on one side thereof:
            a substantially spherical ball having a cylindrical through hole, said ball disposed between said outer races; and,
            a pair of retainer rings disposed outside of said outer races,
    wherein each of said spacer collars is formed from a corrosion-resistant material and comprises a substantially cylindrical tube portion and an integrally molded flange attached to an end of said tube portion and extending substantially radially and transversely outwardly therefrom, said integrally molded flange having a larger outer diameter than an inner diameter of said cylindrical hole in said suspension arm, and wherein said flange is provided to protectively cover an end of said cylindrical hole.

9. In a vehicle of the type having a vehicle frame, a bracket attached to the vehicle frame, and one or more suspension arms attached to the bracket on the vehicle frame, the improvement comprising a structure for use in attaching said suspension arms to said brackets, which is inserted into a cylindrical through hole extending through one end of the suspension arm, said structure comprising:
    a bearing assembly disposed centrally within said cylindrical through hole;
    a first sealing ring disposed in a first end of said cylindrical through hole;
    a second sealing ring disposed in a second end, opposite that of said first end, of said cylindrical though hole;
    a first spacer collar, having an inner end and an outer end, disposed within said first end of said cylindrical through hole such that said inner end abuts said bearing assembly and said outer end of extends out distance beyond said first end of said cylindrical through hole, said first spacer collar having a substantially tubular shape with an inner surface and an outer surface, said outer surface abutting said first sealing ring;
    a second spacer collar, having an inner end and an outer end, disposed within said second end of said cylindrical through hole such that said inner end abuts said bearing assembly and said outer end of extends out distance beyond said second end of said cylindrical through hole, said second spacer collar comprising a cylindrical tubular portion with an inner surface and an outer surface, said outer surface abutting said second sealing ring;

wherein each of said first and second spacer collars, respectively, further comprise an integral flange formed on said outer end, said flange having a larger outer diameter than the inner diameter of said cylindrical through hole, thereby substantially covering said cylindrical through hole.

10. A vehicle having the hardware kit of claim 9 installed into suspension arm joints thereof.

* * * * *